US005581488A

United States Patent [19]

Seo

[11] Patent Number: 5,581,488

[45] Date of Patent: Dec. 3, 1996

[54] APPARATUS AND METHOD FOR COMPENSATING FOR NOISE IN SIGNALS

[75] Inventor: Yuzo Seo, Kamakura, Japan

[73] Assignee: Mitsubishi Chemical Corporation, Tokyo, Japan

[21] Appl. No.: 230,554

[22] Filed: Apr. 20, 1994

Related U.S. Application Data

[63] Continuation-in-part of Ser. No. 564,109, Aug. 8, 1990, abandoned.

[30] Foreign Application Priority Data

Aug. 10, 1989 [JP] Japan .................................... 1-205823
Aug. 10, 1989 [JP] Japan .................................... 1-205824

[51] Int. Cl.[6] ................................ G06F 1/02; G06F 7/54

[52] U.S. Cl. ............................... 364/571.05; 364/571.02; 364/571.06; 364/574

[58] Field of Search .............................. 364/559, 571.01, 364/571.02, 571.03, 571.04, 571.05, 571.06, 571.07, 571.08, 574; 341/116, 118

[56] References Cited

U.S. PATENT DOCUMENTS

| | | | |
|---|---|---|---|
| 3,668,693 | 6/1972 | Eaton et al. | 341/116 |
| 3,713,141 | 1/1973 | Higgins et al. | 341/116 |
| 4,335,443 | 6/1982 | Dickey | 341/116 X |
| 4,458,322 | 7/1984 | Veale | 364/571 |
| 4,697,168 | 9/1987 | Baker | 364/559 X |
| 4,831,510 | 5/1989 | Dummermuth et al. | 341/116 X |
| 4,858,158 | 8/1989 | Ishikawa | 364/571.01 |
| 5,041,979 | 8/1991 | Hirka et al. | 364/571.01 |
| 5,155,696 | 10/1992 | Shibata et al. | 364/571.01 |
| 5,202,842 | 4/1993 | Suzuki | 364/571.01 |
| 5,305,241 | 4/1994 | Hayashi et al. | 364/559 X |

FOREIGN PATENT DOCUMENTS

| | | | |
|---|---|---|---|
| 2081247 | 3/1971 | France | H03K 13/00 |
| 2040469 | 8/1980 | United Kingdom | H02K 24/00 |

OTHER PUBLICATIONS

A. A. Zinkovskii et al., "Synchro Transformers as Displacement Sensors on NC Machine Tools", Machines and Tooling, vol. XLV, No. 12, 1974, pp. 26–30.

J. W. Lindsey, "High Resolution Comes to Limit Switches", Machine Design, vol. 60, No. 13, Jun. 9, 1988, pp. 126–129.

*Primary Examiner*—Ellis B. Ramirez
*Assistant Examiner*—M. Kemper
*Attorney, Agent, or Firm*—Stephen F. K. Yee

[57] ABSTRACT

Signal compensation apparatus and method compensates for and removes errors due to error factors included in source signals x and y approximated by the sine function and cosine function, respectively, from a measurement apparatus such as a resolver or an encoder. Compensation is achieved by approximating the source signals x and y as expressions which include the terms due to the error factors, detecting the maximum values of x, x+y, etc., and determining coefficients corresponding to the error factors on the basis of the relationships between the maximum values and the coefficients, and removing the errors from the signals provided by the measurement apparatus.

16 Claims, 10 Drawing Sheets

APPARATUS AND METHOD FOR COMPENSATING FOR NOISE IN SIGNALS

CROSS REFERENCE TO RELATED APPLICATION

This application is a continuation-in-part of pending application Ser. No. 07/564,109, filed on Aug. 8, 1990, now abandoned and assigned to the assignee of this application.

BACKGROUND OF THE INVENTION

1. Field of the Invention

This invention relates to a signal compensator which automatically deletes noise components of signals approximated by sin θ and cos θ, to produce sin θ and cos θ signals with low distortion. In particular, this invention can be applied to high-resolution measurement of position or angle for resolver and encoder signals through arc-tangent operation, to reduce measurement error.

2. Background Art

Resolvers and encoders are widely used to measure rotational angles (θ). Resolvers output one or more signal cycles approximated by sin θ and cos θ for each revolution, and these are processed (by arc-tangent operation) to produce a signal equivalent to θ. Encoders output several dozen to several thousand signal cycles approximated by sin θ and cos θ for each revolution, and in most cases the wave numbers of these signals are used to count the amount of rotation. Where higher resolution is required, arc-tangent operation is used to yield θ just as for resolvers.

To determine θ through arc-tangent operation with high precision, distortion-free sin θ and cos θ signals are essential. But, in fact, a variety of distortion components are included in the signals. Further, changes in temperature-related and time-related device characteristic can affect the amount of distortion present.

These problems can be avoided to some extent through the use of high-stability devices, temperature compensation for electronic circuitry, and precise adjustment. These measures, however, increase the cost of the equipment and still leave doubt as to reliability.

The inventor has proposed a magnetoresistance element (U.S. Pat. No. 4,843,365) providing low-distortion sin θ and cos θ signals through the use of a magnetic encoder. But even the use of this element can not prevent the obtained signal from degenerating through amplifier zero drift, gain fluctuation, and non-linearity. In addition, improper device positioning and scale pitch error can prevent realization of the full potential of the device.

SUMMARY OF THE INVENTION

Accordingly, it is an object of this invention to provide a signal compensator which automatically deletes noise components generated in measurement instrumentation by sine and cosine functions signal zero point and amplitude fluctuations, and cross-talk, to produce low-distortion sine and cosine signals.

It is another object of this invention to provide a signal compensator which can measure position or angle with high resolution to reduce measurement error, and which makes possible an inexpensive high-precision measurement system.

In order to attain the above objects, this invention provides a signal compensator for eliminating error due to at least one of amplitude difference, zero point variation, cross-talk, second-order harmonics and third-order harmonics of two signals x and y approximated by sine function and cosine function, respectively, said signal compensator comprising: a first means for approximating the two signals x and y by the following expressions, and detecting respective maximum values of $d_0$, $d_1$, $d_2$, $d_3$, $d_4$, $d_5$, $d_6$, and $d_7$, of x, x+y, y, −x+y, −x, −x−y, −y and x−y:

$$x=G(\cos\theta+g\cos\theta+k\sin\theta-b_x\cos 2\theta+h\cos 3\theta)+z_x$$

$$y=G(\sin\theta-g\sin\theta+k\cos\theta+b_y\cos 2\theta-h\sin 3\theta)+z_y$$

where G, g, k, $b_x$, $b_y$, h, $z_x$, and $z_y$ are respective coefficients corresponding to the size of respective error factors consisting of average amplitude, amplitude difference between the two signals x and y, cross-talk, second-order harmonics included in the signal x, second-order harmonics included in the signal y, third-order harmonics included in both signals x and y at the same amount respectively, zero point of the signal x and zero point of the signal y; a second means for determining at least one of the coefficients using the following expressions providing the relationships between the values detected by the first means and the respective sizes of the error factors:

$$d_0 = G(1+g-b_x+h)+z_x$$

$$d_1 = \sqrt{2}\ G(1+k-h)+z_x+z_y$$

$$d_2 = G(1-g-b_y+h)+z_y$$

$$d_3 = \sqrt{2}\ G(1-k-h)-z_x+z_y$$

$$d_4 = G(1+g+b_x+h)-z_x$$

$$d_5 = \sqrt{2}\ G(1+k-h)-z_x-z_y$$

$$d_6 = G(1-g+b_y+h)-z_y$$

$$d_7 = \sqrt{2}\ G(1-k-h)+z_x-z_y$$

and; a third means for compensating the signals x and y, or a signal or signals derived from the signals x and y, using the coefficients determined by the second means.

This invention improves measurement precision by automatically determining the value of the distortion components in the signal processing step and subtracting the distortion components from the signals, and by predicting measurement error due to distortion components and compensating the result. These operations are handled digitally with a microprocessor, providing high reliability and stability with simple adjustment.

DETAILED DESCRIPTION OF THE PREFERRED EMBODIMENTS

Figure 1:
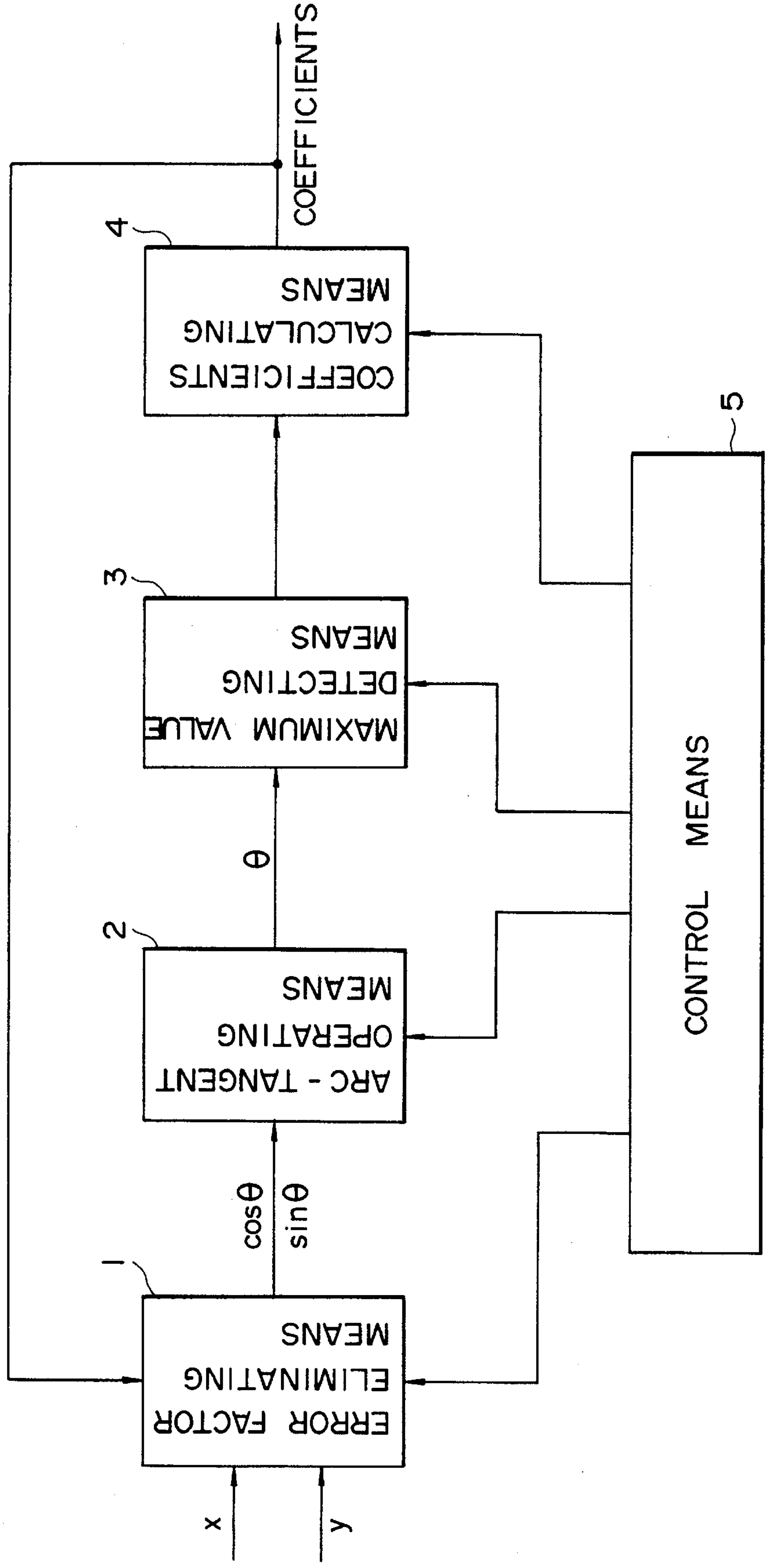
FIG. 1 is a block diagram showing the configuration of one example of the signal compensator according to this invention.

First, the principle of this invention will be explained more fully. The signal compensator of this invention is connected to the output of a measuring apparatus, such as a resolver, an encoder, and so on, through amplifiers and analog-to-digital (A/D) converters for signals x and y. The input signals x and y of this signal compensator can be approximated by the following expressions:

$$x=G(\cos\theta+g\cos\theta+k\sin\theta-b_x\cos 2\theta+h\cos 3\theta)+z_x \quad (1)$$

$$y=G(\sin\theta-g\sin\theta+k\cos\theta+b_y\cos 2\theta-h\sin 3\theta)+z_y \quad (2)$$

where G is the average amplitude and does not affect the arc-tangent operation, but the other coefficients g, k, $b_x$, $b_y$, h, $z_x$ and $z_y$ all cause errors.

Coefficient g represents the amplitude difference between x and y, and if the gain of their signal amplifiers differs, a non-zero value will result. Amplifier gain is generally determined by the resistance, but this itself contains error which makes precise adjustment difficult. Further, temperature causes change in resistance, and therefore, when the amount of change on the signal x side differs from that on the signal y side, the second terms appear in the expressions (1) and (2).

Coefficient k indicates cross-talk, and is a non-zero value when the phase difference between x and y is not precisely π/2. This occurs when the signal lines approach and cause signal mixing between them, or when the encoder scale pitch is different from the value demanded by the detector pitch.

Coefficients $b_x$ and $b_y$ indicate the non-linearity of the amplifiers, and are non-zero values if their non-linearity cannot be neglected. The relation between non-linear amplifier input $v_i$ and output $v_0$ can be approximated by the second-order function $v_o=a\,v_i-b\,v_i^2+c$, and when $v_i$ is replaced by sin θ and cos θ the following expressions result, causing the appearance of the fourth terms in the expressions (1) and (2) above:

$$a\cos\theta-b\cos^2\theta+c=a\cos\theta-(b/2)\cos 2\theta+b/2+c$$

$$a\sin\theta-b\sin^2\theta+c=a\sin\theta+(b/2)\cos 2\theta-b/2+c$$

The amount of non-linearity is dependent on the amplifier itself, and therefore the size of the fourth terms may differ between x and y.

Coefficient h represents the amount of third-order harmonics present, and will be a non-zero value when the source signal (unprocessed signal) from the detector is distorted from a sine wave. Distortion of the signal from the sine wave means harmonic content of a variety of orders and phases. However, for measurement instruments such as resolvers and encoders the detector is generally designed to be symmetric with respect to the signal sign and direction of rotation, so that harmonics of even orders and harmonics of odd orders with phases different from the fundamental wave will be suppressed. In these measurement devices the magnetic field distribution is unified by the air gap to reduce high-order harmonics, leaving third-order harmonics dominant. This means that the distortion of the source signal from the detector can be approximated by the fifth terms in the expressions (1) and (2) above.

The terms $z_x$ and $z_y$ express the zero points of the signals, and will be non-zero values when the zero point fluctuation or adjustment error cannot be ignored. Amplifiers exhibit a phenomenon called drift, where temperature change and other factors can cause the zero point to vary. In many cases the zero point can be adjusted with a variable resistance (trimmer), but precise adjustment is difficult and temperature change will cause variation in resistance as well. In this case, the sixth terms appear in expressions (1) and (2). When the measurement circuit functions from a single power supply, or when A/D converter outputs only positive values, this tenn appears in operation processing, but this is a problem in the definition of the reference point or in the signing system used for integers, and therefore, outside the scope of this invention.

This invention monitors input signals x and y to automatically determine any of the above coefficients that cannot be ignored and compensates accordingly. Where all coefficients are determined the procedure is as described below.

The maximum values for x, x+y, y, −x+y, −x, −x−y, −y and x−y are determined respectively as $d_o$, $d_1$, $d_2$, $d_3$, $d_4$, $d_5$, $d_6$ and $d_7$. This may appear to be a random parameter selection, but $d_i$, corresponds to the maximum value for the general expression x cos i(π/4)+y sin i(π/4). This is equivalent to π/4 radii for the Lissajous' curve obtained when the x and y signals are plotted orthogonally. In this specification, however, where i is an odd number $d_i$, the value in the above general expression can be treated as times √2. This is because the expression itself can be simplified, reducing the operations required. This treatment is employed in the actual operation. The coefficients $d_o$ through $d_7$ have the following relationships:

$$d_0=G(1+g-b_x+h)+z_x$$

$$d_1=\sqrt{2}\,G(1+k-h)+z_x+z_y$$

$$d_2=G(1-g-b_y+h)+z_y$$

$$d_3=\sqrt{2}\,G(1-k-h)-z_x+z_y$$

$$d_4=G(1+g+b_x+h)-z_x$$

$$d_5=\sqrt{2}\,G(1+k-h)-z_x-z_y$$

$$d_6=G(1-g+b_y+h)-z_y$$

$$d_7=\sqrt{2}\,G(1-k-h)+z_x-z_y$$

And their sums and differences result in the following values $s_0$ through $s_7$:

$$s_0=(d_0-d_4)/2=z_x-Gb_x$$

$$s_1=(d_1-d_5)/2=z_x+x_y$$

$$s_2=(d_2-d_6)/2=z_y-Gb_y$$

$$s_3=(d_3-d_7)/2=-z_x+z_y$$

$$s_4=(d_o+d_4)/2=G(1+g+h)$$

$$s_5=(d_1+d_5)/2\sqrt{2}=G(1+k-h)$$

$$s_6=(d_2+d_6)/2=G(1-g+h)$$

$$s_7=(d_3+d_7)/2\sqrt{2}=G(1-k-h)$$

This allows the coefficients to be determined through the following expressions:

$$z_x=(s_1-s_3)/2$$

$$z_y=(s_1+s_3)/2$$

$$Gb_x=z_x-s_0$$

$$Gb_y=z_y-s_2$$

$$Gg=(s_4-s_6)/2$$

$$Gk=(s_5-s_7)/2$$

$$Gh=s_4-s_5+s_6-s_7)/4$$

$$G=(s_4+s_5+s_6+s_7)/4$$

Once these are known, approximate values for sin θ and cos θ are determined from the expressions:

$$\cos\theta\approx A=(x-z_x)/G$$

$$\sin\theta\approx B=(y-z_y)/G$$

making it possible to apply the double angle formula as:

$$\cos 2\theta\approx C=A^2-B^2$$

$$\cos 3\theta\approx D=A(A^2-3B^2)$$

$$\sin 3\theta\approx E=B(3A^2-B^2)$$

and to compensate the source signal through product with Gg, Gk, $Gb_x$, $Gb_y$ and Gh:

$$G\cos\theta\approx x-G\ g\ A-G\ k\ B+Gb_xC-Gh\ D-z_x$$

$$G\cos\theta\approx y+G\ g\ B-G\ k\ A-G\ b_yC+G\ h\ E-z_y$$

The coefficients $d_o$ through $d_7$ represent the maximum values for x, x+y, y, −x+y, −x, −x−y, −y and x−y. However, since the encoder or resolver shaft cannot be expected to rotate at a fixed speed, simple peak detection methods cannot be used. Since x and y are signals approximating cos θ and sin θ, it is possible to detect these values by sampling x, x+y, etc., where θ is i π/4.

Of course, there is the possibility that θ is exactly equal to i π/4, but since cos 2π/64=0.995 and cos 2θ/128=0.999, signal measurement with a 0.1% resolution would allow angles from ±2π/64 to ±2π/128 to be used as the maximum values.

Usually, the value θ used here is obtained through arc-tangent operation, but the value which has not been subjected to arc-tangent operation may be used in some cases. For example, when θ is close to zero, θ can be approximated by sin θ, and when y or its compensated absolute value is small, it is sufficient to sample $d_o$ when x is positive or $d_4$ when x is negative. In the same way, when the absolute x value is small it is sufficient to sample $d_2$ or $d_6$ depending on the sign of y, and $d_1$ or $d_5$ depending on the sign of x+y when the absolute value of x−y is small, and $d_7$ or $d_3$ depending on the sign of x−y when the absolute value of x+y is small.

While measurement values will contain error due to intensity variation stemming from noise and scaling position, it can be expected that peak value change over time is slight, and therefore, some form of averaging for peak sampling is desirable. In this case a moving average is often used, but this requires storage of a great number of past measurement points, and this is ill-suited to microprocessors with limited storage capacity. If the expression $$d_o=d_o+p(x-d_o)$$

is used to update the peak value (given that p is a constant where 0<p<1), it is sufficient to store only the latest peak value, which is extremely advantageous. This method is in fact a weighed average where weighing is reduced exponentially with time.

Use of this method means that as the rotating shaft stops near i π/4, the specific peak value would be continuously updated. This would make the averaging to a specific biased data, and generate bad such as causing gain fluctuation to be misinterpreted as zero point variations. To avoid this, it is desirable to perform $d_i$ correction and $d_{i\pm4}$ correction alternately.

Expressions (1) and (2) above take into account all possible factors for error, but in fact in most cases it is sufficient to compensate only for amplitude and zero point variation. In these cases, coefficients k, $b_x$, $b_y$, and h can be replaced by 0, as described below.

Where error factors are due only to amplitude and zero point fluctuations, the input signals can be expressed as:

$$x=g_x\cos\theta+z_x$$

$$y=g_y\sin\theta+z_y$$

where $g_x$=G (1+g) and $g_y$=G (1−g). In this case only $d_o$, $d_2$, $d_4$ and $d_6$ need be used, with relations:

$$d_o=g_x+z_x$$

$$d_2=g_y+z_y$$

$$d_4=g_x-z_x$$

$$d_6=g_y-z_y$$

This allows the determination of:

$$g_x=(d_o+d_4)/2$$

$$g_y=(d_2-d_6)/2$$

$$z_x=(d_o-d_4)/2$$

$$z_y=(d_2-d_6)/2$$

In this case signal compensation is simplified, and the following expressions can be used:

$$\cos\theta=(x-z_x)/g_x$$

$$\sin\theta=(y-z_y)/g_y$$

It is interesting to compare these extremely simple compensation expressions and the complete compensation expressions given above. It can be seen that the third harmonics enlarges the amplitude to (1+h) times, and that the second harmonics changes zero points by $-Gb_x$ and $-Gb_y$ only. This can be taken to mean that where the third harmonics can be ignored G can be determined with the simplified expression, and where the second-order harmonics can be ignored the simplified expression can be used to determine $z_x$ and $z_y$. Further, because G error is canceled by the arc-tangent operation and because errors in other coefficients are canceled where second terms can be ignored, the same result is obtained regardless of which expression is used to determine G, for all practical purposes.

Where the amplitudes of two input signals are equal and only the cross-talk term is left, in other words where $g=b_x=b_y=h=0$, the source signals can be given as:

$$x=G(\cos\theta+k\sin\theta)+z_x$$

$$y=G(\sin\theta+k\cos\theta)+z_y$$

When the relations for $d_1$, $d_3$, $d_5$ and $d_7$ are:

$$d_1=\sqrt{2}\;G(1+k)+z_x+z_y$$

$$d_3=\sqrt{2}\;G(1-k)-z_x+z_y$$

$$d_5=\sqrt{2}\;G(1+k)-z_x-z_y$$

$$d_7=\sqrt{2}\;G(1-k)-z_x-z_y$$

this results in the calculation of coefficients as:

$$G=(d_1+d_3+d_5+d_7)/4\sqrt{2}$$

$$z_x=(d_1-d_3-d_5+d_7)/4$$

$$z_y=(d_1+d_3-d_5-d_7)/4$$

$$k=(d_1-d_3+d_5-d_7)/4\sqrt{2}\;G$$

The method described above consists of detection of the amount of the error factors included in the source signal, and compensation by subtracting these from the source signal. If the size of the error factor is known, it is possible to estimate the size of the error when a signal with that error component is arc-tangent processed, allowing compensation of the operation results. This method is described below.

The source signal can be represented in vector notation as follows:

$$|r^*=|r+|g+|k+|b+|h+\bar{z}$$

Each vector can be expressed as indicated below when the components are given:

$$|r^*=\frac{1}{G}\begin{pmatrix}x\\y\end{pmatrix}$$

$$|r=\begin{pmatrix}\cos\theta\\\sin\theta\end{pmatrix}$$

$$|g=g\begin{pmatrix}\cos\theta\\-\sin\theta\end{pmatrix}$$

$$|k=k\begin{pmatrix}\sin\theta\\\cos\theta\end{pmatrix}$$

$$|b=\cos 2\theta\begin{pmatrix}-b_x\\b_y\end{pmatrix}$$

$$|h=\begin{pmatrix}\cos 3\theta\\-\sin 3\theta\end{pmatrix}$$

$$\bar{z}=\frac{1}{G}\begin{pmatrix}z_x\\z_y\end{pmatrix}$$

Although the angle θ between the vector |r and the X axis is needed, the angle determined through arc-tangent operation using the source signal is the angle θ* between |r* and the X axis. The difference between them can be approximated by the tangential components $g_t$, $k_t$, $b_t$, $h_t$ and $z_t$ of the vectors |g, |k, |b, |h and $\bar{z}$. These tangential components are given by the inner product of each vector and the tangential unit vectors (−sin θ, cos θ) to produce the following expressions:

$$g_t=-g\sin 2\theta$$

$$k_t=k\cos 2\theta$$

$$b_t=b_x\sin\theta\cos 2\theta+b_y\cos\theta\cos 2\theta$$

$$h_t=-h\sin 4\theta z_t=(-z_x\sin\theta+z_y\cos\theta)/G$$

These, then, can be used in the expression:

$$\theta=\theta^*-g_t-k_t-h_t-z_t$$

to accurately determine the angle θ. Note that where the absolute error vector is small compared to 1, the error can be calculated using θ* instead of θ.

Either of the two compensation methods described above may be used individually, or they may be used specifically to match different error factors. In practical application the correction of the effects of third-order harmonics at the source signal requires more calculations, and compensation of angle error may therefore, be more efficient. But direct compensation of other errors at the source signal is generally most efficient. Application requires selection of the optimum method, taking into account the amount of calculation required and remembering that accurate compensation is not possible where error is large because compensation is implemented through approximation.

FIG. 1 shows a block diagram of one example of the signal compensator of this invention, which comprises an error factor eliminating means 1, an arc-tangent operating means 2, a maximum value detecting means 3, a coefficients calculating means 4 and control means 5.

The error factor eliminating means I receives the input signals x and y, approximates the signals in accordance with the above-mentioned expressions, and compensates the signals using the coefficients supplied from the coefficients calculating means 4. The arc-tangent operating means 2 receives the compensated cos θ and sin θ signals and calculates θ by arc-tangent operation. The arc-tangent operation is an established principle used in signal processing wherein the angle of the signal, i.e., θ, is determined by the familiar mathematical arc-tangent ($\tan^{-1}$) function. As can be seen from FIG. 2, the angle being calculated is the arc-tangent of the ratio of x and y. Thus, for example, the $\tan^{-1}$ of ½ is 26.56 degrees.

The maximum value detecting means 3 detects the maximum values of x, x+y, etc., using the method mentioned above. The coefficients calculating means 4 calculates the coefficients in accordance with the above-mentioned expressions providing the relationships between the maximum values detected by the maximum value detecting means 3 and the respective size of the error factors. The output of the coefficients calculating means 4 is fed back to the error factor eliminating means 1 for compensation. The control means 5 controls the operations of the means 1 through 4.

Figure 2:
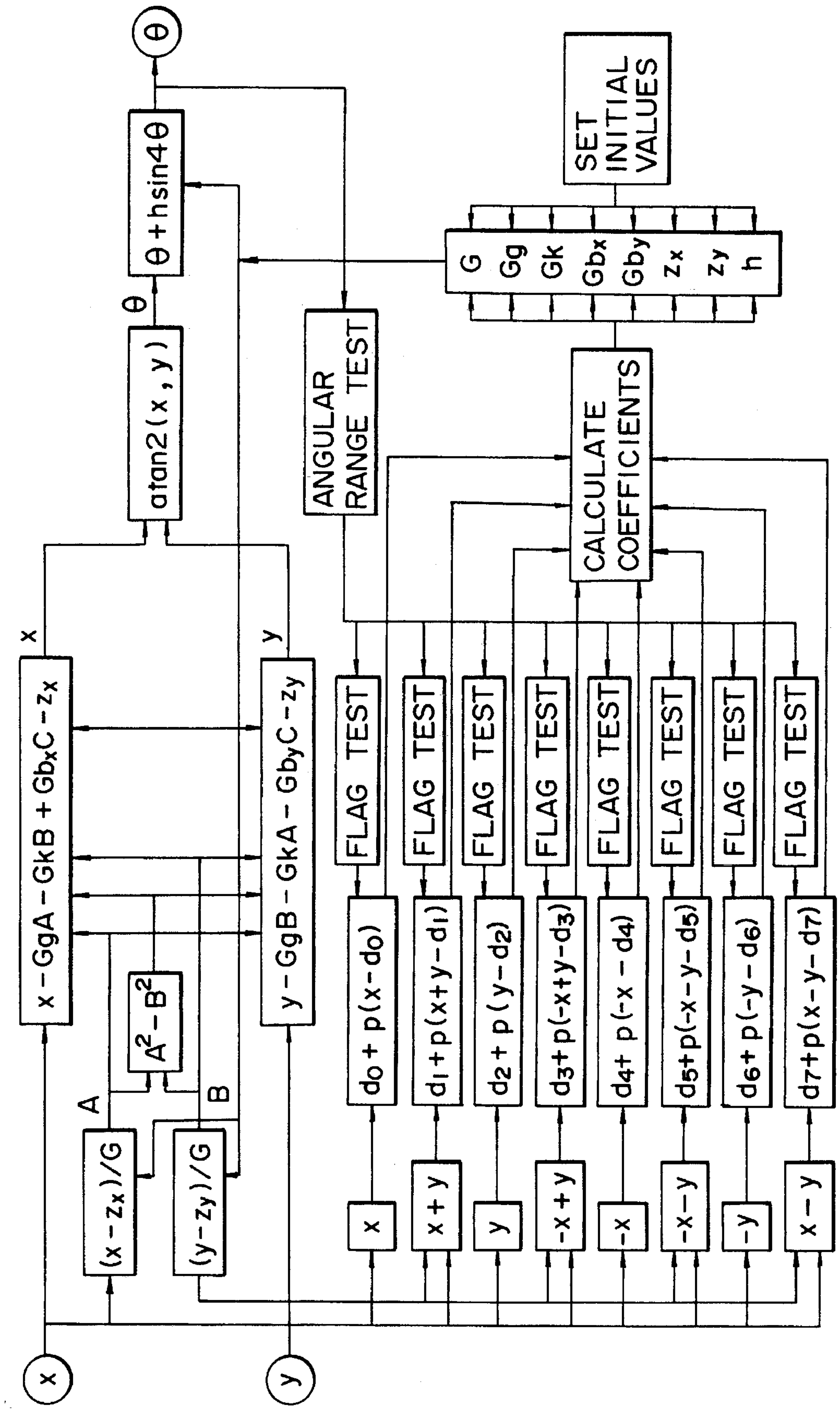
FIGS. 2 and 3, 3(*a*)–(*c*) are flow charts showing the data flow and the processing flow, respectively, in the signal compensator in FIG. 1.
Figure 3A:
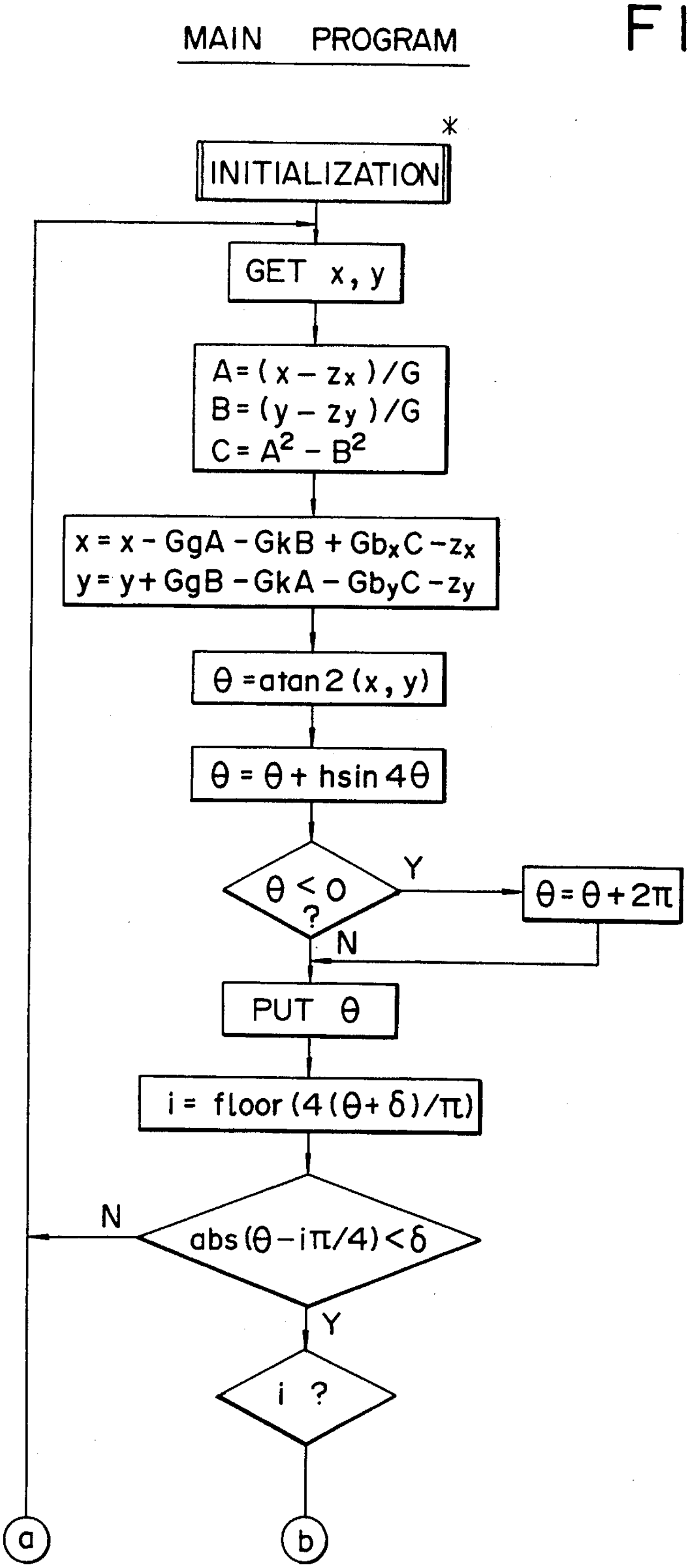
Figure 3:
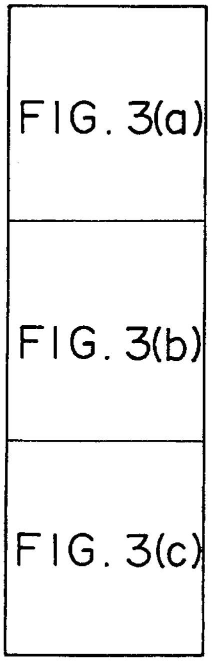
Figure 3B:
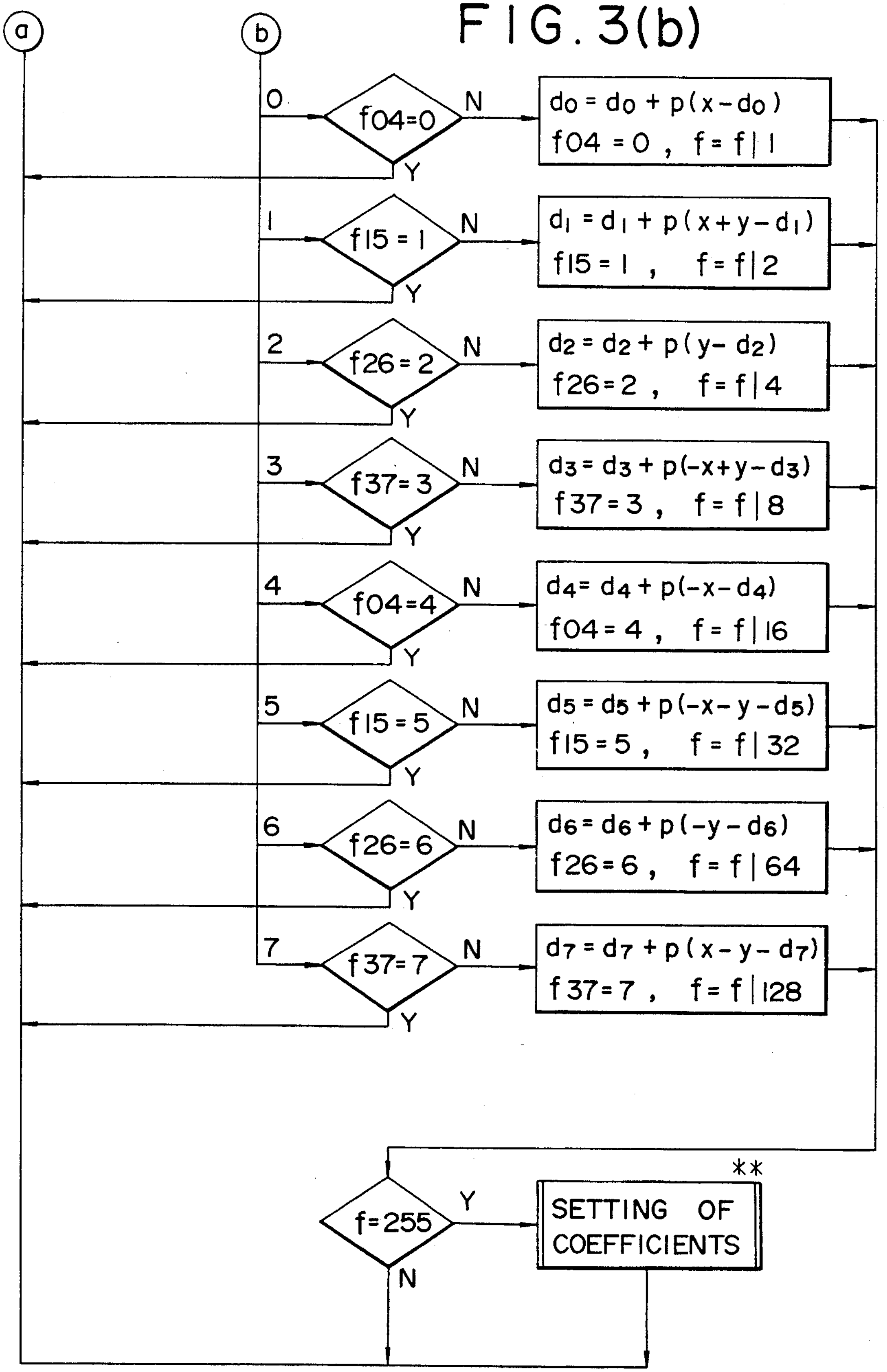
Figure 3C:
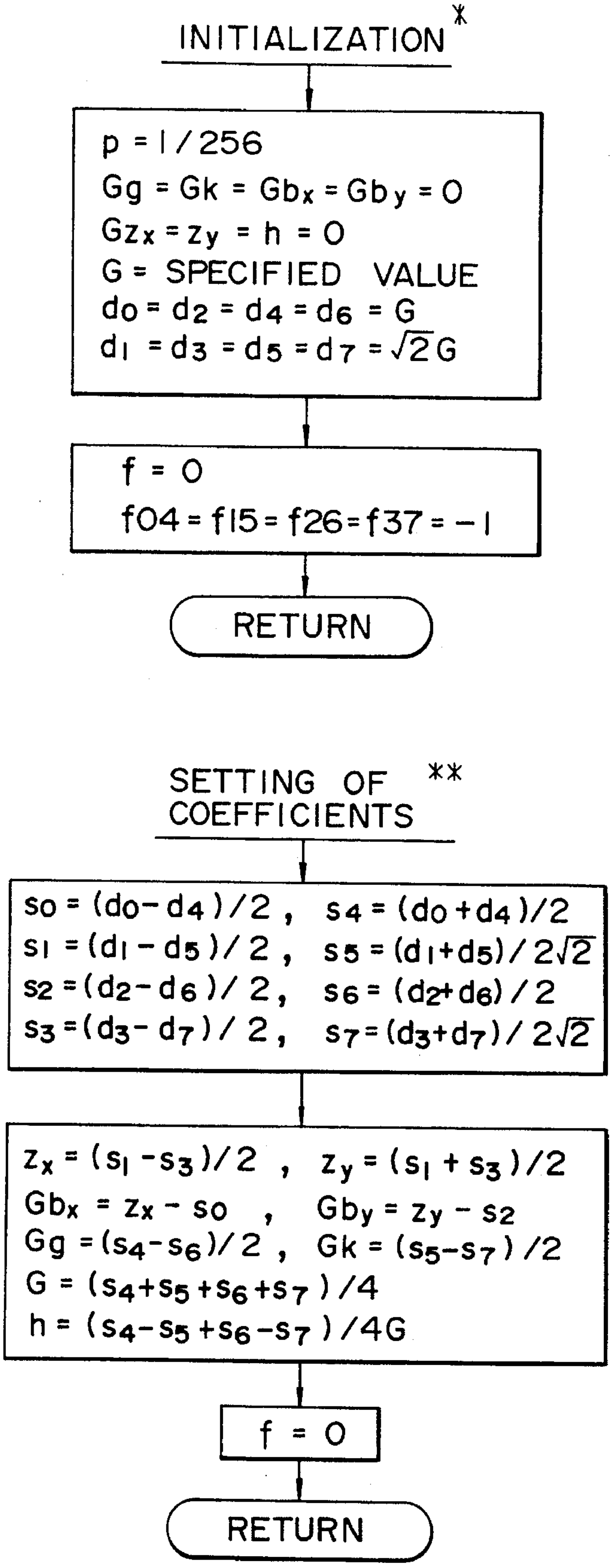

FIG. 2 indicates the data flow in the signal compensator of FIG. 1, and FIGS. 3 (*a*)–(*c*) indicate the processing flow of a microprocessor handling the signal processing described in this invention, giving C language function names and operators. When the program as shown is started, it initializes the parameters (setting errors to zero, setting amplitude to specified values, setting maximum values to values indicated by amplitude), and then enters a compensation operation loop. The functions in the INITIALIZATION block are shown at the top of FIG. 3(*c*).

Within the loop the signals x and y are read from A/D converters or other devices (not shown), and the zero point amplitude used to determine cos θ and sin θ. The double angle formula is then used to determine cos 2θ. Next, the values determined above and the coefficients representing the amounts of included error are used to compensate the signals, and θ is determined through arc-tangent operation. The arc-tangent operation here is iterated for the angular range of vector (x,y) from −π to π, just as with the C language function atan2. This function actually is implemented by case branching and table reference through the signs of both signals and the absolute value size functions. Next, error due to the third harmonics is predicted, compensated for, and the result output as a value from 0 to 2π.

Next, the value of θ is used to determine if any maximum values need to be compensated. Maximum value compensation is carried out alternately (using a flag such as f04, FIG. 3(*b*)) for the values where θ is different by π from each other. Exponential smoothing is used in compensation to weight the latest value with 1/256 weighing (in this example). After compensation, the alternating compensation flag and the flag indicating that all maximum values have been reset (approximate f bit) are set. Finally, the coefficients are recalculated if all have been updated.

FIG. 3 follows C language expression to make comprehension easier, but Assembler description is actually used to enhance execution speed. Processing flow is simplified in this figure, but in fact actual processing consists of multiple interrupt routines operating together to minimize the time from input of the signals to output of θ.

Figure 4A:
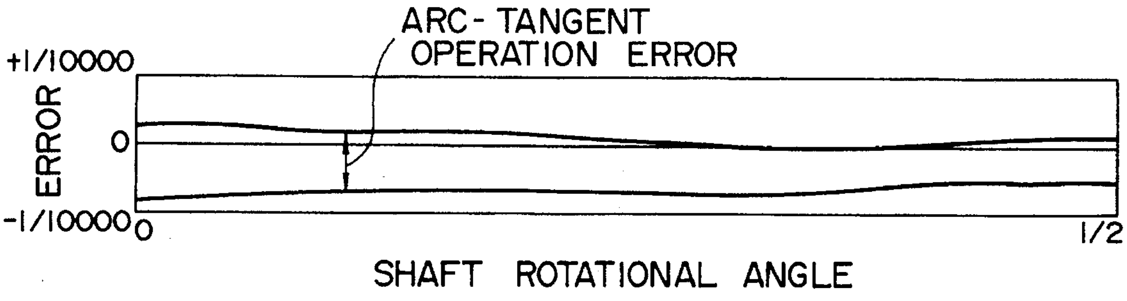
FIGS. 4(*a*) and 4(*b*) are graphs showing the change of error after power is turned on, for one rotation in the positive direction.
Figure 4B:
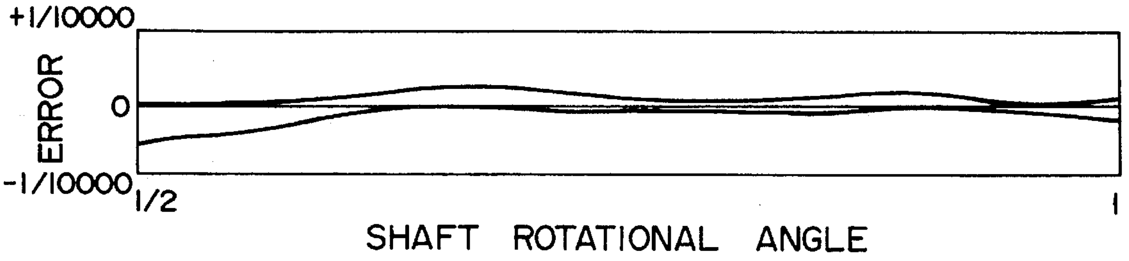
Figure 5:
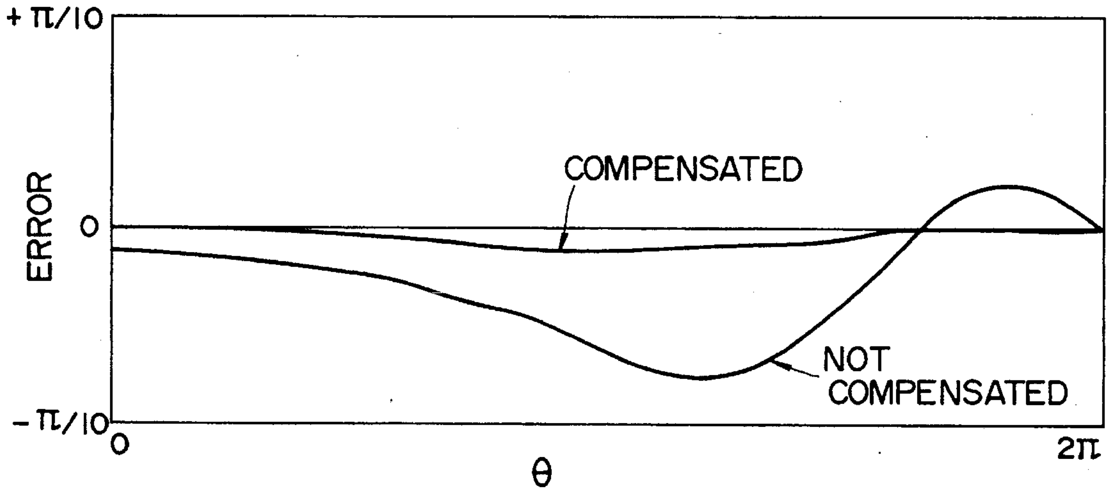
FIG. 5 is a graph showing the size of error after compensation, compared with that before compensation.

FIGS. 4 (*a*) and (*b*) show the change in error in an encoder after power is turned on, for one rotation in the positive direction. FIGS. 4(*a*), (*b*) indicate, respectively, the error for the first half-rotation and the second half-rotation, at ±1/10000 rotations full-scale. In this case, one rotation of the encoder shaft corresponds to 512 cycles of sin θ and cos θ. In FIGS. 4(*a*), (*b*), the arc-tangent error reduces with the rotation of the shaft. FIG. 5 also plots the arc-tangent operation error before and after compensation, with ordinate of ±1/10000 rotations and abscissa of θ from 0 to 2π. From these figures it is clear that error rapidly decreases with rotation after the power is turned on, demonstrating the effectiveness of the present invention.

FIGS. 6–9 show illustrative circuits which may constitute the present signal compensator, and the flow of signals therein. The term “S/H” denotes a sample and hold circuit, and “Comp” denotes a digital comparator for detecting a value at or near the angle indicated to the right of the respective comparator in FIG. 6. Additional details of the compensating circuit 6, the error factor computing circuit 7 and the arc-tangent operating circuit 8 are shown respectively in FIGS. 7, 8 and 9. The compensating circuit 6 (FIGS. 6 and 8) and the error factor computing circuit 7 (FIGS. 6 and 7) comprise, in part, the error factor eliminating means 1 shown in FIG. 1. In these figures, “Mul” denotes a multiplier; “Div”, a divider; “Sq”, a square multiplier for calculating the square of the input signal value; and the numerals in the blocks are the numerical values by which the input signal values are multiplied.

Figure 6:
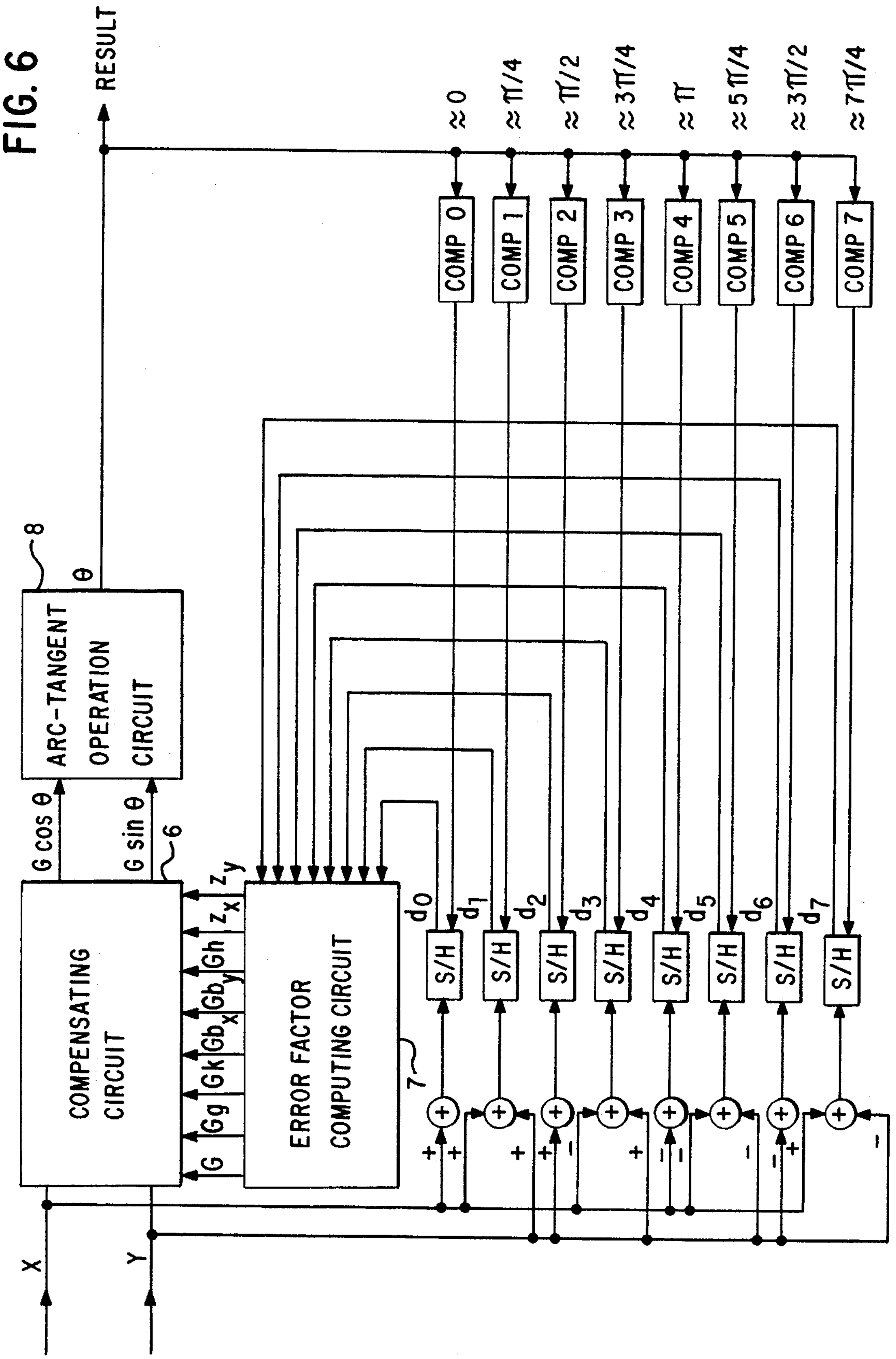
FIG. 6 is an illustrative circuit diagram for the signal compensator shown in FIG. 1.
Figure 7:
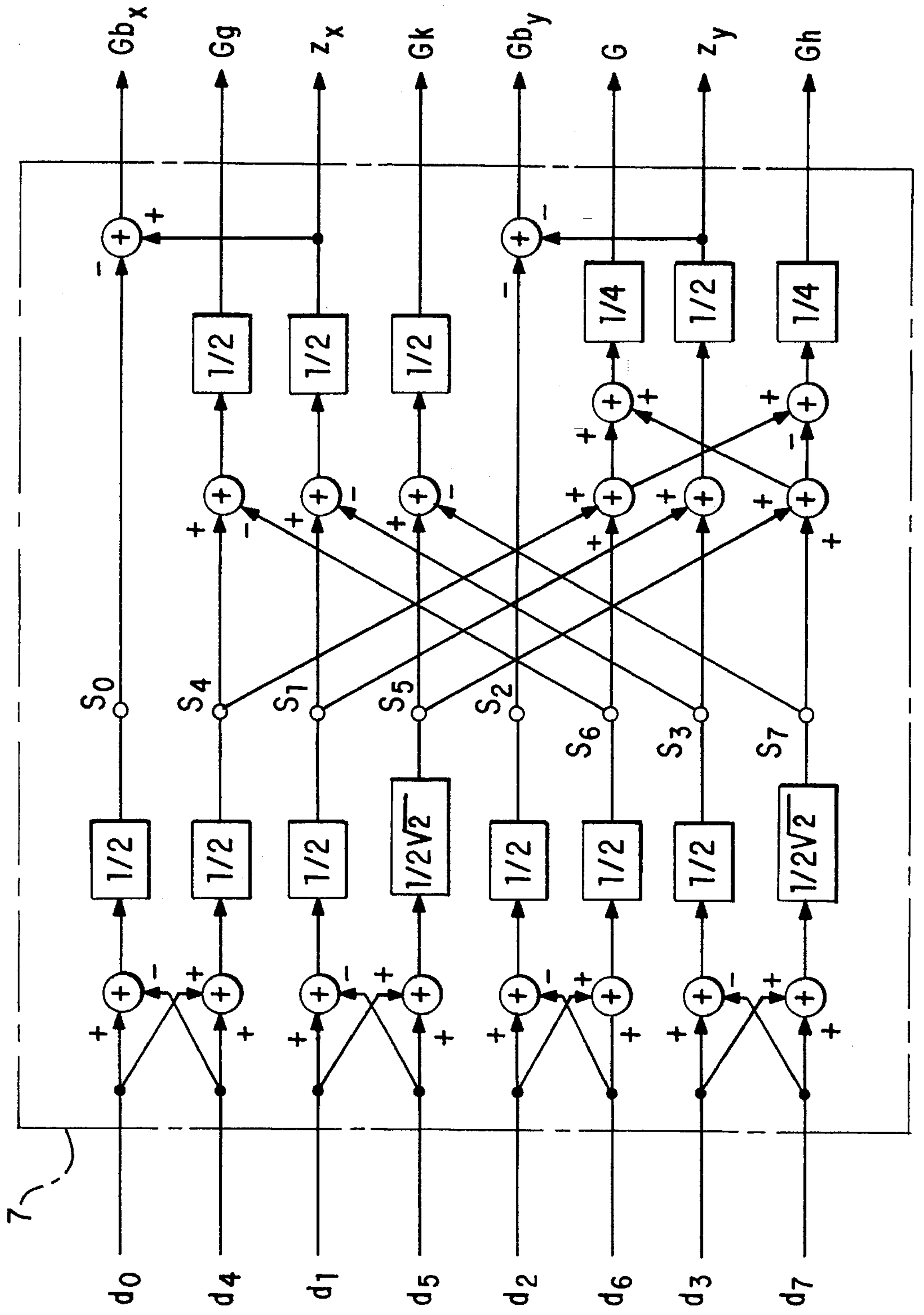
FIG. 7 is an illustrative diagram for the error factor computing circuit of FIG. 6.
Figure 8:
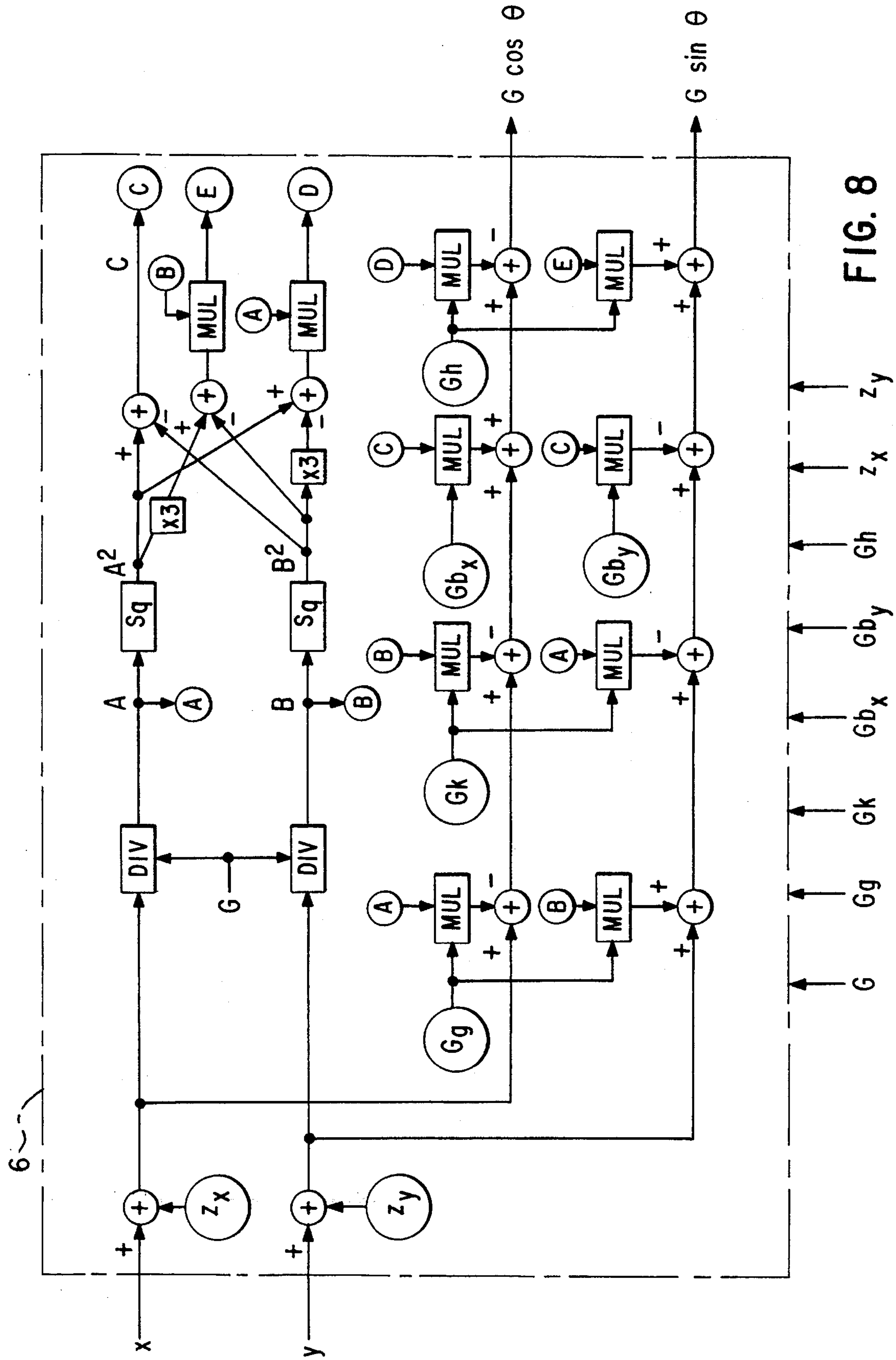
FIG. 8 is an illustrative diagram for the compensating circuit of FIG. 6.
Figure 9:
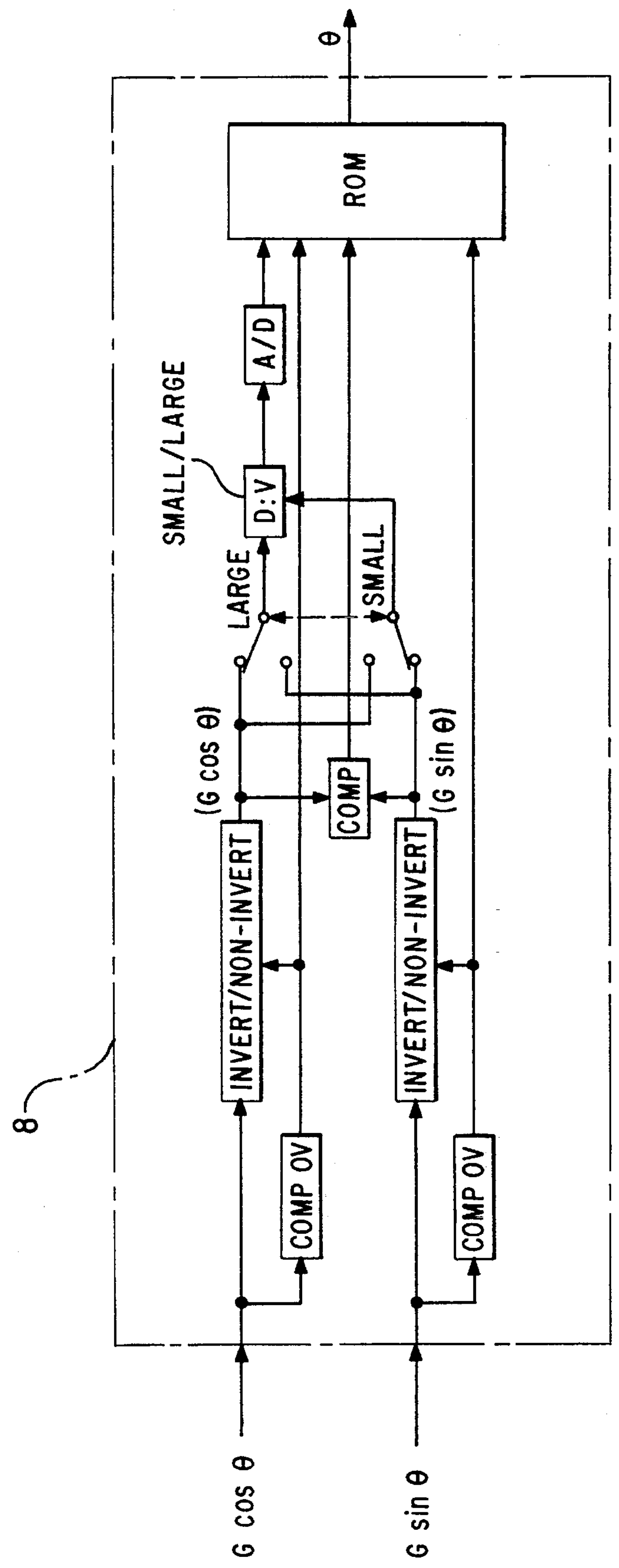
FIG. 9 is an illustrative diagram for the arc-tangent operation circuit of FIG. 6.

In FIG. 7, the error factor computing circuit 7 receives the coefficients $d_0$–$d_7$ from the respective sample-and-hold (S/H) circuits and provides as output the error factor coefficients described above. As shown in FIGS. 6 and 8, the output from the error factor computing circuit 7 is received by the compensating circuit 6, along with the source signals x and y from the measurement device (not shown), and used to compensate the source signals through the product with Gg, Gk, $Gb_x$, $Gb_y$ and Gh, as described above, to provide as output G cos θ and G sin θ. This output is received by the arc-tangent operation circuit 8 (FIGS. 6 and 9), an illustrative circuit for the arc-tangent operating means 2 in FIG. 1, and used to provide the value of the angle θ. As shown in FIG. 9, the determination of θ can be achieved using a table reference wherein the angle-tangent values are stored, for example, on a read-only memory (ROM), a common technique in the art.

It is, of course, possible to embody the invention in specific forms other than described above without departing from the spirit of the present invention. The embodiment described above is merely illustrative and should not be considered restrictive in any way. The scope of the invention is given in the appended claims, rather than the above description, and all variations and equivalents which fall within the range of the claims are intended to be embraced therein.

What is claimed is:

1. An apparatus for compensating for measurement errors included in the output from a measurement device for sensing the angular position θ (theta) of a rotating member, the output signals x and y from said device being represented as a sine function and a cosine function of the angle θ, respectively, said apparatus comprising:

compensating means receiving said output signals x and y and generating approximations of said signals as the average amplitude of the input signals and error factors consisting of at least one of amplitude difference between the two signals x and y, cross-talk, second-order harmonics included in the signal x, second-order harmonics included in the signal y, third-order harmonics included in both signals x and y at the same amount, respectively, zero point of the signal x and zero point of the signal y;

first computational means using the approximations from said compensating means for determining the maximum values of x, x+y, y, −x+y, −x, −x−y, −y and x−y and providing output signals of said maximum values as $d_0$, $d_1$, $d_2$, $d_3$, $d_4$, $d_5$, $d_6$ and $d_7$, respectively; and second computational means for receiving the output of said first computational means and determining the magnitude of the respective error factors based upon the input from said first computational means;

said compensating means using said approximation signals and the magnitude of the error factors from said second computational means, removing said error factors from the x and y signals from said measurement device, or a signal or signals derived from the signals x and y, and providing as outputs error-compensated x and y signals as sin θ and cos θ, wherein said apparatus monitors the signals x and y, automatically determines the measurement error from the magnitude of the error factors and compensates the signals accordingly by removing said error components to provide output compensated signals of improved precision.

2. An apparatus as claimed in claim 1, wherein said compensating means provides said approximation x and y signals in accordance with the following relationships:

$$x=G(\cos\theta+g\cos\theta+k\sin\theta-b_x\cos 2\theta+h\cos 3\theta)+z_x$$

$$y=G(\sin\theta-g\sin\theta+k\cos\theta+b_y\cos 2\theta-h\sin 3\theta)+z_y$$

where G, g, k, $b_x$, $b_y$, h, $z_x$, $z_y$ are coefficients corresponding to the size of respective error factors consisting of average amplitude, amplitude difference between the two signals x and y, cross-talk, second-order harmonics included in the signal x, second-order harmonics included in the signal y, third-order harmonics included in both signals x and y at the same amount respectively, zero point of the signal x and zero point of the signal y; and said second computational means determines the magnitude of the respective error factors in accordance with the following relationships:

$$d_0 = G(1 + g - b_x + h) + z_x$$

$$d_1 = \sqrt{2}\ G(1 + k - h) + z_x + z_y$$

$$d_2 = G(1 - g - b_y + h) + z_y$$

$$d_3 = \sqrt{2}\ G(1 - k - h) - z_x + z_y$$

$$d_4 = G(1 + g + b_x + h) - z_x$$

$$d_5 = \sqrt{2}\ G(1 + k - h) - z_x - z_y$$

$$d_6 = G(1 - g + b_y + h) - z_y$$

$$d_7 = \sqrt{2}\ G(1 - k - h) + z_x - z_y.$$

3. An apparatus as claimed in claim 2, wherein the error factors are due to signal amplitude and zero point fluctuation and said compensating means provides said approximation x and y signals in accordance with the following expressions:

$$x = g_x \cos\theta + z_x$$

$$y = g_y \sin\theta + z_y$$

where $g_x$=G(1+g) and $g_y$=G(1−g);

said first computational means determines the maximum values of x, y, −x and −y and provides output signals of said maximum values as $d_0$, $d_2$, $d_4$ and $d_6$; and said second computational means determines the magnitude of the respective error factors in accordance with the following expressions:

$$d_0 = g_x + z_x$$

$$d_2 = g_y + z_y$$

$$d_4 = g_x - z_x$$

$$d_6 = g_y - z_y.$$

4. An apparatus as claimed in claim 2, wherein the amplitudes of the signals from the measurement device are equal and the error factor is due only to cross-talk, said compensating means provides said approximation x and y signals in accordance with the following relationships:

$$x = G(\cos\theta + k\sin\theta) + z_x$$

$$y = G(\sin\theta + k\cos\theta) + z_y$$

said first computational means determines the maximum values of x+y, −x+y, −x−y and x−y and provides output signals of said maximum values as $d_1$, $d_3$, $d_5$ and $d_7$; and said second computational means determines the magnitude of the respective error factors in accordance with the following expressions:

$$d_1 = \sqrt{2}\ G(1 + k) + z_x + z_y$$

$$d_3 = \sqrt{2}\ G(1 - k) - z_x + z_y$$

$$d_5 = \sqrt{2}\ G(1 + k) - z_x - z_y$$

$$d_7 = \sqrt{2}\ G(1 - k) + z_x - z_y.$$

5. An apparatus as claimed in claim 2, wherein the signal to be compensated is θ derived from the signals x and y through arc-tangent operation.

6. An apparatus as claimed in claim 2, 3 or 4, wherein said first computational means determines the maximum values $d_i$ on the basis of signal values at $\theta = i\,\pi/4 \pm \delta$ where δ is an angle whose cosine value can be approximated by 1 to adjust for the speed variation of the rotating member.

7. An apparatus as claimed in claim 6, wherein the maximum values are compensated by exponential smoothing.

8. An apparatus as claimed in claim 6, wherein the compensation is carried out alternately for the maximum values wherein θ is different from each other by π.

9. An apparatus for compensating for measurement errors included in the output from a measurement device for sensing the angular position θ (theta) of a rotating member, the output signals x and y from said device being represented as a sine function and a cosine function of the angle θ, respectively, said apparatus comprising:

(i) compensating means receiving said signals x and y and generating approximations of said signals as the average amplitude of the input signals and the error factors consisting at least of one of amplitude difference between the two signals x and y, cross-talk, second-order harmonics included in the signal x, second-order harmonics included in the signal y, third-order harmonics included in both signals x and y at the same amount respectively, zero point of the signal x and zero point of the signal y;

(ii) first computational means using the approximations from said compensating means for determining the maximum values of x, x+y, y, −x+y, −x, −x−y, −y and x−y and providing output signals of said maximum values as $d_0$, $d_1$, $d_2$, $d_3$, $d_4$, $d_5$, $d_6$ and $d_7$, respectively;

(iii) second computational means for receiving the output of said first computational means and determining the magnitude of the respective error factors based upon the input from said first computational means;

(iv) said compensating means using said approximation signals and the magnitude of the error factors from said second computational means, removing said error factors from the x and y signals from said measurement device, or a signal or signals derived from the signals x and y, and providing as outputs error-compensated x and y signals as sin θ and cos θ;

(v) arc-tangent operating means receiving the compensated signals from said compensating means for determining the value of θ by arc-tangent operation; and (vi) control means for controlling the operations of said compensating means, said first and second computational means, and said arc-tangent operating means, wherein said apparatus monitors the signals x and y, automatically determines the measurement error from the magnitude of the error factors and compensates the signals accordingly by removing said error components to provide output compensated signals of improved precision.

10. An apparatus as claimed in claim 9, wherein said compensating means provides said approximation x and y signals in accordance with the following relationship:

$$x=G(\cos\theta+g\cos\theta+k\sin\theta-b_x\cos 2\theta+h\cos 3\theta)+z_x$$

$$y=G(\sin\theta-g\sin\theta+k\cos\theta+b_y\cos 2\theta-h\sin 3\theta)+z_y$$

where G, g, k, $b_x$, $b_y$, h, $z_x$, $z_y$ are coefficients corresponding to the size of respective error factors consisting of average amplitude, amplitude difference between the two signals x and y, cross-talk, second-order harmonics included in the signal x, second-order harmonics included in the signal y, third-order harmonics included in both signals x and y at the same amount respectively, zero point of the signal x and zero point of the signal y; and said second computational means determines the magnitude of the respective error factors in accordance with the following relationships:

$$d_0=G(1+g-b_x+h)+z_x$$

$$d_1=\sqrt{2}\,(1+k-h)+z_x+z_y$$

$$d_2=G(1-g-b_y+h)+z_y$$

$$d_3=\sqrt{2}\,G(1-k-h)-z_x+z_y$$

$$d_4=G(1+g+b_x+h)-z_x$$

$$d_5=\sqrt{2}\,G(1+k-h)-z_x-z_y$$

$$d_6=G(1-g+b_y+h)-z_y$$

$$d_7=\sqrt{2}\,G(1-k-h)+z_x-z_y.$$

11. An apparatus as claimed in claim 10, wherein the error factors are due to signal amplitude and zero point fluctuations and said compensating means provides said approximation x and y signals in accordance with the following expressions:

$$x=g_x\cos\theta+z_x$$

$$y=g_y\cos\theta+z_y$$

where $g_x$=G(1+g) and $g_y$=G(1−g);

said first computational means determines the maximum values of x, y, −x and −y and provides output signals of said maximum values as $d_0$, $d_2$, $d_4$ and $d_6$; and said second computational means determines the magnitude of the respective error factors in accordance with the following equations:

$$d_0=g_x+z_x$$

$$d_2=g_y+z_y$$

$$d_4=g_x-z_x$$

$$d_6=g_y-z_y.$$

12. An apparatus as claimed in claim 10, wherein the amplitude of the signal from the measurement device are equal and the error factor is due only to cross-talk and said compensating means provides said approximation x and y signals in accordance with the following relationships:

$$x=G(\cos\theta+k\sin\theta)+z_x$$

$$y=G(\sin\theta+k\cos\theta)+z_y$$

said first computational means determines the maximum values of x+y, −x+y, −x−y and x−y and provides output signals of said maximum values as $d_1$, $d_3$, $d_5$ and $d_7$; and said second computational means determines the magnitude of the respective error factors in accordance with following expressions:

$$d_1=\sqrt{2}\,G(1+k)+z_x+z_y$$

$$d_3=\sqrt{2}\,G(1-k)-z_x+z_y$$

$$d_5=\sqrt{2}\,G(1+k)-z_x-z_y$$

$$d_7=\sqrt{2}\,G(1-k)+z_x-z_y.$$

13. An apparatus as claimed in claim 9, wherein the signal to be compensated is θ provided by said arc-tangent operating means.

14. An apparatus as defined in claim 9, 10 or 11, wherein to adjust for the speed variation of the rotating member said first computational means determines the maximum values $d_i$ on the basis of signal values at $\theta=i\,\pi/4\pm\delta$ where δ is an angle whose cosine value can be approximated by 1.

15. An apparatus as defined in claim 14, wherein the maximum values are compensated by exponential smoothing.

16. An apparatus as defined in claim 14, wherein the compensation is carried out alternately for the maximum values wherein θ is different by π from each other.

* * * * *